(12) United States Patent
Bai et al.

(10) Patent No.: US 10,883,902 B2
(45) Date of Patent: Jan. 5, 2021

(54) SHOWER/SAFETY SHOWER/FIRE SPRINKLER TESTING DEVICE

(71) Applicants: Yufeng Bai, Chadds Ford, PA (US); Li Ma, Wilmington, DE (US)

(72) Inventors: Yufeng Bai, Chadds Ford, PA (US); Li Ma, Wilmington, DE (US)

(73) Assignee: FORCEBEYOND, New Castle, DE (US)

( * ) Notice: Subject to any disclaimer, the term of this patent is extended or adjusted under 35 U.S.C. 154(b) by 0 days.

(21) Appl. No.: 15/768,007

(22) PCT Filed: Jul. 12, 2017

(86) PCT No.: PCT/US2017/041631
§ 371 (c)(1),
(2) Date: Apr. 13, 2018

(87) PCT Pub. No.: WO2018/057087
PCT Pub. Date: Mar. 29, 2018

(65) Prior Publication Data
US 2019/0301982 A1    Oct. 3, 2019

Related U.S. Application Data

(60) Provisional application No. 62/397,432, filed on Sep. 21, 2016.

(51) Int. Cl.
*A62C 37/50*  (2006.01)
*G01N 1/20*   (2006.01)
*G01M 99/00*  (2011.01)

(52) U.S. Cl.
CPC ............... *G01N 1/20* (2013.01); *A62C 37/50* (2013.01); *G01M 99/008* (2013.01)

(58) Field of Classification Search
CPC ....... A63C 37/50; G01M 99/008; G01N 1/20; A62C 37/50
See application file for complete search history.

(56) References Cited

U.S. PATENT DOCUMENTS

| | | | | |
|---|---|---|---|---|
| 3,387,497 A | * | 6/1968 | Huntington | G01N 1/20 73/863.54 |
| 3,585,864 A | * | 6/1971 | Dellyes | G01N 1/20 73/863.43 |
| 4,303,396 A | * | 12/1981 | Swiatosz | A62C 99/0081 434/226 |
| 4,413,363 A | * | 11/1983 | Troiano | A47K 3/325 4/596 |
| 4,861,270 A | * | 8/1989 | Ernst | A62C 99/0081 434/226 |

(Continued)

FOREIGN PATENT DOCUMENTS

| | | | |
|---|---|---|---|
| CN | 202166667 U | * | 3/2012 |
| CN | 204556439 U | * | 8/2015 |

(Continued)

*Primary Examiner* — David J Bolduc
(74) *Attorney, Agent, or Firm* — Gann G. Xu

(57) ABSTRACT

This is directed to a testing apparatus for measuring property data of a solid, a gas, a liquid. This is particularly directed to a testing device for testing a water system such as a shower, a safety shower, or a fire sprinkler. This is also directed to a testing process for testing a water system such as a shower, a safety shower, or a fire sprinkler.

18 Claims, 3 Drawing Sheets

(56) References Cited

U.S. PATENT DOCUMENTS

| | | | | |
|---|---|---|---|---|
| 5,233,869 A | * | 8/1993 | Rogers | A62C 99/0081 |
| | | | | 340/604 |
| 5,335,559 A | * | 8/1994 | Rogers | A62C 99/0081 |
| | | | | 250/343 |
| 5,345,830 A | * | 9/1994 | Rogers | A62C 99/0081 |
| | | | | 374/100 |
| 5,375,275 A | * | 12/1994 | Sanders | A47K 3/286 |
| | | | | 4/599 |
| 5,804,716 A | * | 9/1998 | McGuire | A62C 37/50 |
| | | | | 73/198 |
| 6,000,074 A | * | 12/1999 | Glover | A47K 3/325 |
| | | | | 4/599 |
| 6,085,585 A | * | 7/2000 | Yu | G09B 25/04 |
| | | | | 434/226 |
| 6,779,399 B2 | * | 8/2004 | Liljegren | G01F 23/02 |
| | | | | 73/426 |
| 9,802,197 B2 | * | 10/2017 | Vahidi | B01L 3/502715 |
| 2003/0124496 A1 | * | 7/2003 | Hough | A62C 99/0081 |
| | | | | 434/226 |
| 2003/0154763 A1 | * | 8/2003 | Cain | A62C 37/50 |
| | | | | 73/1.16 |
| 2006/0117873 A1 | * | 6/2006 | Rosar | A47K 3/281 |
| | | | | 73/865.9 |
| 2010/0170329 A1 | * | 7/2010 | Greeves | F02M 65/001 |
| | | | | 73/114.45 |
| 2011/0277694 A1 | * | 11/2011 | Euse | A01K 31/04 |
| | | | | 119/462 |
| 2012/0188076 A1 | * | 7/2012 | McSheffrey | A62C 13/76 |
| | | | | 340/539.17 |
| 2015/0153252 A1 | * | 6/2015 | Yu | G01M 99/008 |
| | | | | 73/168 |
| 2015/0223784 A1 | * | 8/2015 | Van Damme | A61B 5/14507 |
| | | | | 73/864.63 |
| 2015/0260559 A1 | * | 9/2015 | Werbach | G01F 1/8404 |
| | | | | 73/649 |
| 2015/0330872 A1 | * | 11/2015 | Habibi | G01M 99/008 |
| | | | | 702/182 |
| 2017/0100617 A1 | * | 4/2017 | Kochelek | A62C 37/50 |
| 2018/0148310 A1 | * | 5/2018 | Bishel | G01F 13/006 |
| 2019/0301982 A1 | * | 10/2019 | Bai | A62C 37/50 |

FOREIGN PATENT DOCUMENTS

| | | | | |
|---|---|---|---|---|
| CN | 204556440 U | * | 8/2015 | |
| CN | 205015247 U | * | 2/2016 | |
| CN | 206420737 U | * | 8/2017 | |

* cited by examiner

SHOWER/SAFETY SHOWER/FIRE SPRINKLER TESTING DEVICE

FIELD OF THE DISCLOSURE

This disclosure is directed to a shower, safety shower, or fire sprinkler testing device. This disclosure is further directed to a testing apparatus for producing property data of solid, gas, superfluid and liquid.

BACKGROUND

Currently there are a number of solutions for testing laboratory and plant safety showers. One of these solutions attempts to hire a company to test the shower equipment on a regular basis. But this solution fails to meet the needs of the market because this can be a costly option. Another solution attempts to use current testers on the market. But this solution is also unable to meet the market needs because available testers lack the mobility to be used on a daily basis and are limited in their testing capabilities.

Therefore, it is in need for a better testing device and method.

SUMMARY

The present invention is directed to a testing apparatus comprising: a base portion comprising a collection container; a height adjustable stem portion functionally coupled to the base portion; and a funnel portion functionally coupled to the stem portion; wherein the liquid testing device is configured to collect a specimen from a specimen discharger and produce property data of the specimen; and wherein the collection container, the stem portion and the funnel portion are functionally coupled so that the specimen is collected in the funnel portion, flows through the stem portion and enters the collection container.

The present invention is also directed to a liquid testing device comprising: a base portion comprising a collection container; a height adjustable stem portion functionally coupled to the base portion; and a funnel portion functionally coupled to the stem portion; wherein the liquid testing device is configured to collect liquid from a liquid discharger and produce property data of the liquid; and wherein the collection container, the stem portion and the funnel portion are functionally coupled so that the liquid is collected in the funnel portion, flows through the stem portion and enters the collection container.

The present invention is further directed to a testing process for producing property data of a liquid, the process comprising the steps of: collecting a specimen of the liquid using a collection device; transporting the specimen through a stem device to a collection container; and storing the specimen in the collection container; measuring a measurement data of the specimen at the collection device, the stem device, the collection container, or a combination thereof; producing the property data of the liquid based on the measurement data; and outputting the property data to a display device, a data storage device, or a combination thereof.

DETAILED DESCRIPTION

Following are more detailed descriptions of various concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

This disclosure is directed to a testing apparatus. The testing apparatus comprises:

a base portion comprising a collection container;

a height adjustable stem portion functionally coupled to the base portion; and a funnel portion functionally coupled to the stem portion;

wherein the testing apparatus is configured to collect a specimen from a specimen discharger and produce property data of the specimen; and wherein the collection container, the stem portion and the funnel portion are functionally coupled so that the specimen is collected in the funnel portion, flows through the stem portion and enters the collection container.

FIGS. 1-8 show examples of the testing apparatus.

Figure 1:
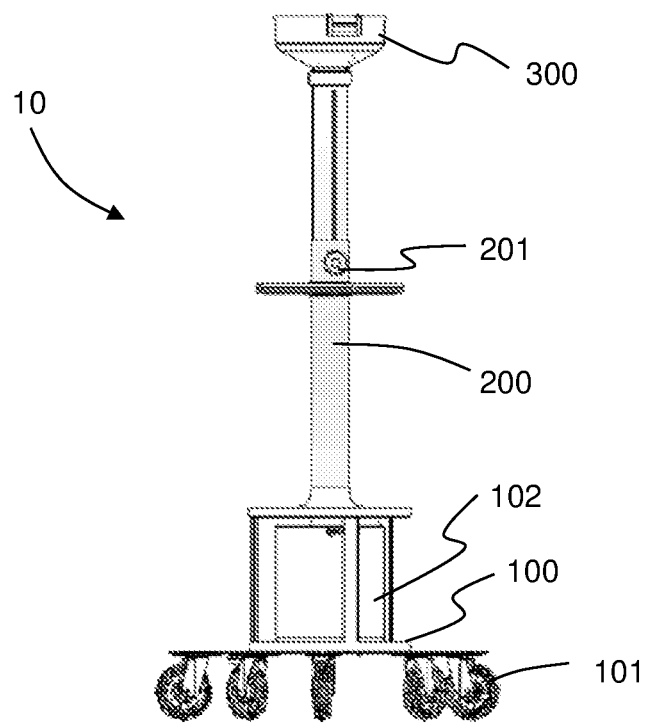
FIG. 1. A front view of an example of configurations of the device.
Figure 2:
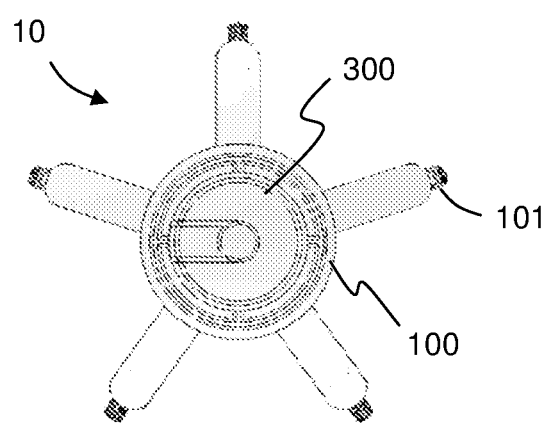
FIG. 2. A top down view of an example of configurations of the device.
Figure 3:
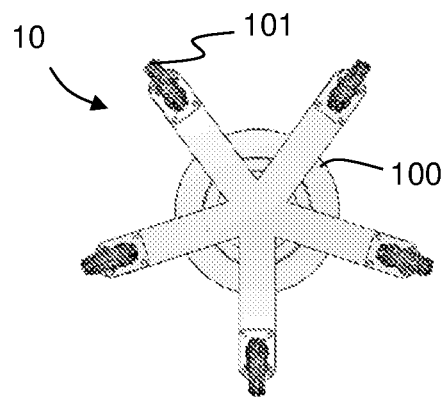
FIG. 3. A bottom up view of an example of configurations of the device.
Figure 4:
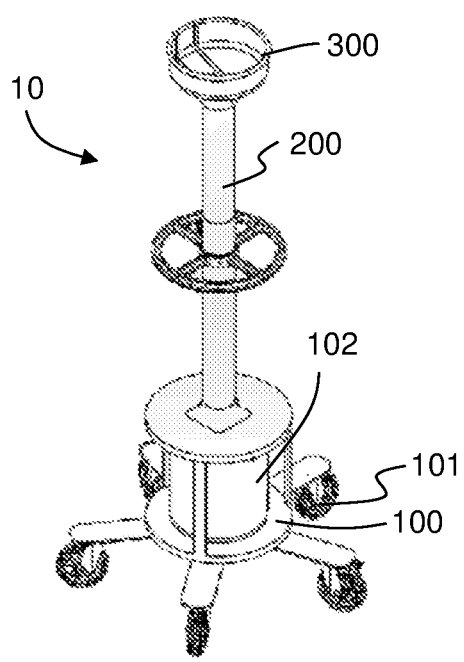
FIG. 4. A perspective view of the device from a side.
Figure 5:
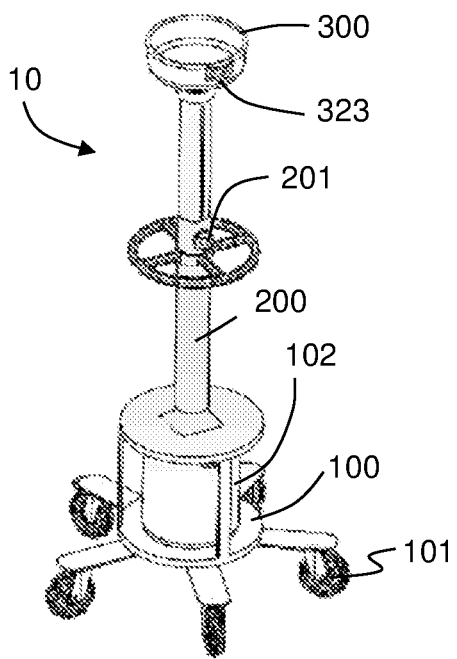
FIG. 5. A perspective view of the device from the front with the height adjust means visible.
Figure 6:
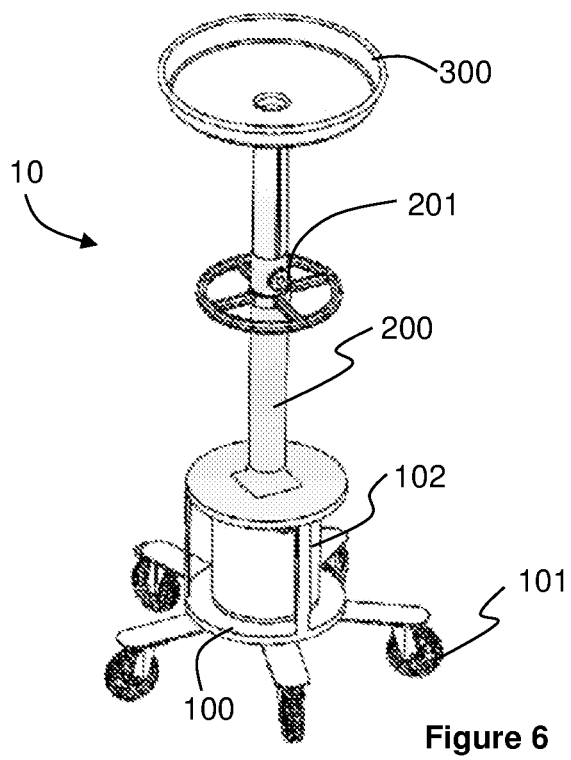
FIG. 6. A perspective view of the device having a large funnel.

The specimen can move from the funnel portion 300 to the collection container 102 via the stem portion 200 by gravity, through a pump, a vacuum, or a combination thereof. In one example, a specimen is flowing by gravity from the funnel to the collection container (FIG. 1). In another example, a specimen is pumped from the funnel to the collection contained. In yet another example, a specimen is flowing by gravity and assisted with a pump. In a further example, a specimen if caused to flow from the funnel portion to the collection container via a negative pressure such as vacuum. The specimen can be stored in the collection container.

The specimen can be a solid, a gas, a superfluid, or a liquid. The solid can be a powder of solid particles having particle sizes in a range of from 1000 nm to 0.5 mm or crushed solid materials having particle sizes in a range of from 0.5 mm to 50 mm. The gas can be any of gaseous materials, such as air, CO, $CO_2$, $N_2$, or any combinations of gases. The superfluid can be a fluid with zero viscosity which therefore flows without loss of kinetic energy. The liquid can be water, a solution, a suspension or an emulsion in water or solvent or a combination of water and solvent. Typical organic or inorganic solvents, or a combination thereof, can be suitable. A combination of solid, gas or liquid can also be suitable, such as solid particles suspended in gas such as air or liquid such as water.

The testing apparatus can further comprise a sealer 310 that can be coupled to the funnel portion 300 and the specimen discharger to reduce spill, leak or splash of the specimen. It is understood by those skilled in the art that when a gas is to be collected, an air-tight sealer is preferred. The sealer can be transparent so a discharge pattern can be visually observed.

The property data can comprise a flow rate of the specimen, volume of the specimen, weight of the specimen, or a combination thereof. The property data further comprise particle size data of the specimen, counts of particles, reflectance or scattering data of the particles, color data, or a combination thereof. The property data can further comprise a flow rate of the specimen, temperature of the specimen, pH of the specimen, content data of the specimen, or a combination thereof. The content data can be selected from ion strength, conductivity, toxic materials, organic solvent amount and type, etc.

In one embodiment, the property data can be selected from a flow rate of the specimen, volume of the specimen, weight of the specimen, particle size data of the specimen, counts of particle, reflectance and scatter data of the particles, color data, temperature of the specimen, pH of the specimen, content data of the specimen, or a combination thereof. The content data can be selected from ion strength, conductivity, toxic materials, organic solvent amount and type, or a combination thereof.

The testing apparatus can further comprise a measurement device selected from a volume measurement device, a weight measurement device, a flow rate measurement device, a pH measurement device, a conductivity measurement device, a pressure measurement device, a thermal measurement device, a content measurement device, a viscosity measurement device, an optical measurement device, or a combination thereof. The optical measurement device can be a digital imaging device such as a camera. In one example, a volume measurement device can comprise a volume indicator on the collection container showing the volume of the specimen collected. The weight measurement device can comprise a scale coupled to the collection container. Any devices suitable for measuring the aforementioned property data can be suitable. The measurement devices can be positioned at the stem portion, such as a first device 321; at the base portion, such as the second device 322; or at the funnel portion, such as the additional devices 320 and 323.

In one example, the specimen is a liquid and the specimen discharger is selected from a shower, a safety shower, a faucet, a sprayer, a lawn sprinkler, or a fire sprinkler.

In another example, the specimen comprises solid items and the property data comprise counts of the solid items in a pre-determined volume or a pre-determined weight. It is understood that the stem portion of the testing apparatus is configured according to sizes of the solid items so the solid items can pass through within the stem portion.

Figure 7A:
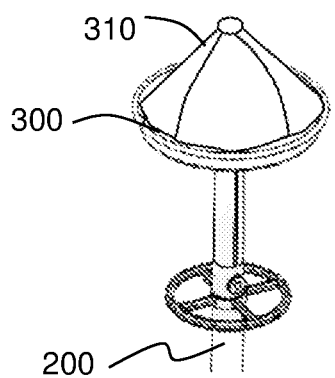
FIG. 7. Examples of configurations of the device. (A) The device with a sealer. (B) An example of the measurement device and a digital control device.
Figure 7B:
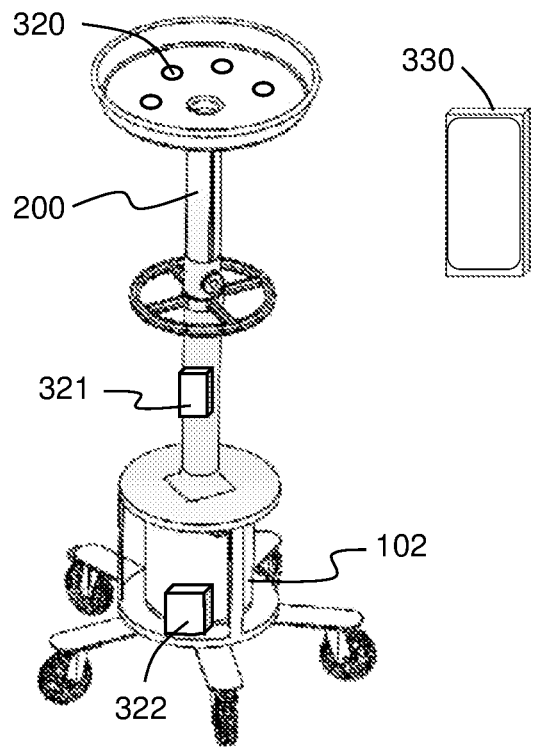

The testing apparatus can further comprise a digital control device functionally coupled to one or more of the measurement devices. The digital control device can be coupled to the measurement device using wired connection, a wireless connection, or a combination thereof. In an example, the digital control device is a wireless device 330 (FIG. 7B). The wireless connection can include, such as, but not limited to, WiFi, Bluetooth, infrared, sonic, radio signal, cellular phone signal, satellite signal, or any suitable wireless coupling devices or connections. In one example, the testing apparatus comprises a wired control device. In another example, the testing apparatus comprises a wireless control device. In yet another example, the testing apparatus comprises both the wired and wireless control devices. In a particular example, the wireless digital control device is selected from a wireless phone, a laptop computing device, an infrared remote control device, or a combination thereof. The measurement device can have corresponding wired or wireless connections so the digital control device and the measurement device can be functionally coupled together. In one example, a weight measurement device can be coupled to a wireless phone to transmit weight data to the phone.

In the testing apparatus disclosed herein, the stem portion can be rigid or flexible. The stem portion can be a tube, a pipe, or any other structures that can allow the specimen moving through within. In one example, the step portion is rigid, such as a tube or pipe made from rigid metal, plastics, composite, glass, or other rigid natural or synthetic materials. In another example, the stem portion is flexible, such as a tube or pipe made from flexible plastics, rubber, flexible metal tubes or ducts, or any other flexible natural or synthetic materials. As disclosed herein, the height of the stem portion can be adjusted.

This invention is also directed to a liquid testing device. The liquid testing device comprises:
 a base portion comprising a collection container;
 a height adjustable stem portion functionally coupled to the base portion; and
 a funnel portion functionally coupled to the stem portion;
 wherein the liquid testing device is configured to collect a liquid from a liquid discharger and produce property data of the liquid; and
 wherein the collection container, the stem portion and the funnel portion are functionally coupled so that the liquid is collected in the funnel portion, flows through the stem portion and enters the collection container.

The liquid can move from the funnel portion 300 to the collection container 102 via the stem portion 200 by gravity, through a pump, a vacuum, or a combination thereof, as described before. The liquid can flow through the stem portion therein. The stem portion can be configured to have an internal passage connecting the funnel portion and the collection container.

The property data can comprise liquid volume, liquid weight, a liquid flow rate, liquid temperature, or a combination thereof. The property data can comprise a pattern of the liquid discharged from the liquid discharger. The property data can further comprise a flow rate of the liquid, temperature of the liquid, pH of the liquid, content data of the liquid, or a combination thereof. The content data can be selected from ion strength, conductivity, toxic materials, organic solvent amount and type, or a combination thereof. The property data can further comprise a pattern of liquid discharge. The liquid testing device can comprise a sealer coupled to the funnel portion and the liquid discharger. The sealer can be transparent so the liquid discharge pattern can be determined by visual inspection.

In one embodiment, the property data can be selected from a flow rate of the liquid, volume of the liquid, weight of the liquid, reflectance and scattering data of the liquid, color data of the liquid, temperature of the liquid, pH of the liquid, content data of the liquid, or a combination thereof. The content data can be selected from ion strength, conductivity, toxic materials, organic solvent amount and type, or a combination thereof. The aforementioned sealer can be required when the liquid is a volatile organic solvent. The liquid testing device can further comprise a toxic material sensing device, a volatile organic solvent sensing device, or a combination thereof. The liquid testing device can further comprise a warning device to provide visual warning, audible warning, or a combination thereof, when the toxic material or the volatile organic solvent concentration around the testing device is exceeding a pre-determined level.

The liquid discharger is selected from a shower, a safety shower, a faucet, a sprayer, a lawn sprinkler, or a fire sprinkler.

The measurement device can be selected from a volume measurement device, a weight measurement device, a flow rate measurement device, a pH measurement device, a conductivity measurement device, a pressure measurement device, a thermal measurement device, a content measurement device, a viscosity measurement device, an optical measurement device, or a combination thereof. In one example, the first device 321 can be a color measurement device or a flow rate measurement device. In another example, the second device 322 can be a weight measurement device. In yet another example, the additional device 323 can be a thermal measurement device and can be placed at the funnel to measure the temperature of the liquid immediately discharged from the liquid discharger. In a further example, a sensor 320, such as a pressure-sensitive sensor, can be placed at the funnel portion to sense the pattern or area distribution of the liquid discharged from the liquid discharger. The liquid testing device can further comprise an imaging device positioned at the funnel portion to capture still images or video images of the discharge pattern. A digital imaging device suitable for producing still images and video images can be suitable. In one example, a water-proof digital camera with a fish-eye lens can be suitable and can be placed at the center of the funnel portion facing the liquid discharger to capture still images or video images of the discharge pattern.

The liquid testing device can further comprise a digital control device functionally coupled to the measurement device. Aforementioned wired or wireless control devices can be suitable. Aforementioned wired or wireless connections can be suitable. Aforementioned sensor can transmit the data to a digital control device via wired connection, wireless connection, or a combination thereof. The aforementioned discharge pattern images can be transmitted to the control device via wired or wireless connections.

The stem portion can be rigid or flexible. As described before and thereafter, the stem portion can be a tube, a pipe, or any other structures that can allow the specimen moving through. In one example, the step portion is rigid, such as a tube or pipe made from rigid metal, plastics, composite, glass, or other rigid natural or synthetic materials. In another example, the stem portion is flexible, such as a tube or pipe made from flexible plastics, rubber, flexible metal tubes or ducts, or any other flexible natural or synthetic materials.

This invention is further directed to a testing process for producing property data of a liquid. The process comprises the steps of:
collecting a specimen of the liquid using a collection device;
transporting the specimen through a stem device to a collection container; and
storing the specimen in the collection container;
measuring a measurement data of the specimen at the collection device, the stem device, the collection container, or a combination thereof; and
producing the property data of the liquid based on the measurement data; and
outputting the property data to a display device to display the property on the display device, to a non-transitory computer readable digital storage device, or a combination thereof.

In one example, the measurement data can be transmitted via a wireless connection from a measurement device to a wireless control device and displayed on the wireless control device.

The testing process can further comprise the steps of detecting the specimen at the collection device to determine the specimen type and activate one or more measurement devices based on the specimen type.

The testing process can further comprise the step of selecting a specimen collection time based on capacity of the collection container, wherein the capacity of the collection container is a volume capacity, a weight capacity, or a combination thereof. In one example, the collection container has a volume capacity of 6 gallons. The specimen collection time can be selected in a range of from about 5 seconds to about 10 seconds for a safety shower that has a designed water discharge flow rate of about 20 gallons per minute to ensure that the discharged water is not exceeding the volume capacity of the collection container.

In one example, a sensor can be places at the funnel portion. When a solid specimen is detected, a pH measurement device is subsequently inactivated. In another example, a computer program is stored in the control device to determine which of the devices to be activated based on the detected specimen type.

The property data can comprise a liquid volume, a liquid weight, a liquid flow rate and liquid temperature. As described herein, the property data can further comprise a flow rate of the specimen, temperature of the specimen, pH of the specimen, content data of the specimen, or a combination thereof.

The property data can also be selected from a flow rate of the liquid, volume of the liquid, weight of the liquid, reflectance and scatter data of the liquid, color data of the liquid, temperature of the liquid, pH of the liquid, content data of the liquid, or a combination thereof. The content data can be selected from ion strength, conductivity, toxic materials, organic solvent amount and type, or a combination thereof. The measurement data and the property data can be the same or different. In one example, the measurement data and the property data are the same, such as a pH of the liquid, temperature of the liquid, or a combination thereof. In another example, the measurement data and the property can be different. For example, a flow rate data such as "gallon per minute" can be produced based on measurement data comprising volume and time, a density data such as "gram per cubic centimeter" can be produced based on measurement data comprising weight and volume. The property data can further be produced based measurement data or another property data. For example, electrolyte conductivity data of a liquid can be produced based on measured current and voltage or based on resistance that can be derived from current and voltage.

This invention is further directed to a testing kit. The testing kit can comprise:
a base portion comprising a collection container;
a height adjustable stem portion that is configured to couple to the base portion; and
a funnel portion that is configured to couple to the stem portion;
wherein the testing kit is configured to couple the collection container, the stem portion and the funnel portion to form a testing device to collect a specimen and to measure at least one measurement data of the specimen.

The testing kit can further comprise a measurement device. Any of the aforementioned devices can be suitable. The measurement device can be selected from a volume measurement device, a weight measurement device, a flow rate measurement device, a pH measurement device, a conductivity measurement device, a pressure measurement device, a thermal measurement device, a content measurement device, a viscosity measurement device, an optical measurement device, or a combination thereof.

The testing kit can further comprise a digital control device configured to functionally couple to the measurement device. Any of aforementioned wired or wireless control devices can be suitable.

This invention is further described below.

The invention is a water flow testing or inspection device, wherein the shower/safety shower/fire sprinkler inspection device is placed underneath the shower head or sprinkler. Water is sprayed directly into a funnel and the basin at the bottom of the device collects the water. By timing the water collection levels indicated on the scale of the basin, i.e., the base portion, the invention aids in the calculation of the water flow rate (gallon per min or liter per min). The sensors including a thermometer can be attached to the funnel or the basin of the inspection device so temperature readings can be displayed and collected during and after the spray inspection process. Interchangeable funnels designed with different diameters and shapes can be positioned at various distances from the shower head to measure the spray diameters and patterns per standard requirements. The spray diameters and patterns can also be measured using such as a pressure-sensitive sensor described herein.

Referring to the figures, FIGS. 1-6 show the shower/safety shower/fire sprinkler inspection device of the present invention and generally referred to as device 10. The device 10 includes a base portion 100, stem portion 200, and funnel portion 300. The base portion 100 includes a plurality of wheels 101 allowing the device 10 to be moved easily and smoothly across a surface. The wheels 101 preferably of the caster type and movable in all directions. The base portion 100 provides resting support for a container 102 to receive tested water. The container 102 preferably includes graduated indicators such as lines or markings so the volume of water collected in the container can be easily determined. The stem portion 200 is positioned above the base portion and aligned with the container 102, wherein water travels through the stem 200 and into the container 102. The stem portion 200 includes a height adjustment means 201. The height adjustment means 201 allows for the adjustment of the stem portion 200 to accommodate varying heights of showers for testing. This height adjustment means 201 can be configured in a multitude of configurations, including but not limited to, telescopic, compression, accordion-like, flexible, and rigid materials. The funnel portion 300 is affixed to an end of the stem portion 200 opposite to the base portion 100. The funnel portion 300 can collect and direct water exiting from the shower into the stem portion 200 and the container 102. The funnel portion 300 can be interchangeable having different diameters allowing for multiple showerhead diameters and tests.

While the invention has been described herein in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

Figure 8:
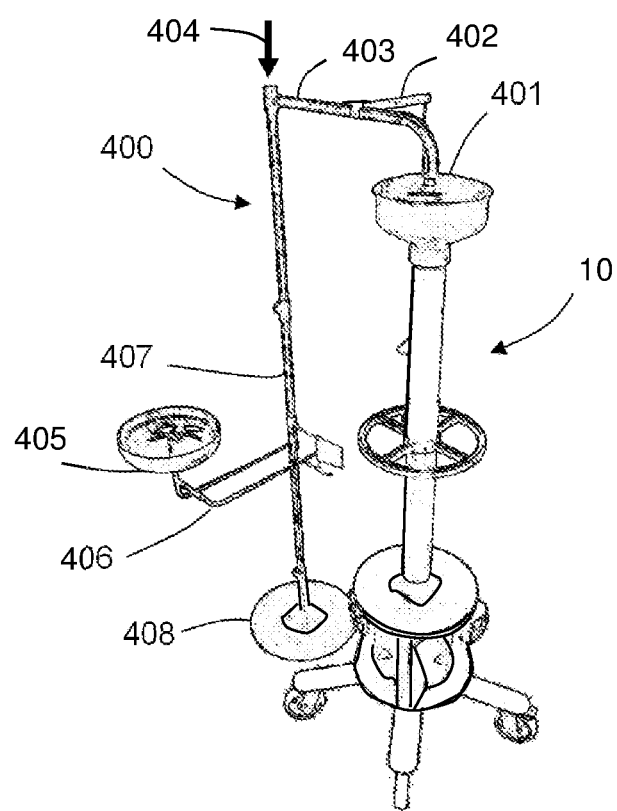
FIG. 8. A perspective view of the device and a safety shower.

In an example, a safety shower is tested with the testing device disclosed herein. Briefly, a shower head 401 of the safety shower 400 can be positioned at the funnel portion so the funnel portion can receive water discharged from the shower head (FIG. 8). The shower head is connected to a water supply 404 via a shower head connection tube 403 and controlled by a shower head switch 402. In one test, the shower head switch 402 is pulled down to allow water discharging from the shower head and flowing into the funnel 300. At a pre-determined time-point, such as 10 seconds, the switch is pushed up to shut off the discharge. Water temperature can be measured from a thermal measurement device place at the funnel, such as the device 323. The volume of water discharged can be measured based on volume indication at the collection container. Optionally, weight of the water is also measured. Water discharge pattern can be determined by visual inspection or with sensing data collected by the aforementioned pressure-sensitive sensor 320. The testing device can have a sealer coupled to the funnel portion and the showerhead. The sealer can be transparent so the water discharge pattern can be determined by visual inspection. The testing device can further comprise an imaging device positioned at the funnel portion to capture still images or video images of the discharge pattern. A digital imaging device suitable for producing still images and video images can be suitable. The data on water volume, temperature and pattern including the digital images of the discharge pattern can be compared to a standard, such as ANSI/ISEA Z358.1. Testing data or a report can be produced to report whether the safety shower is in compliance with the standard. Typically, the safety shower can further comprise a main connection tube 407 connected to an eye washer 405 that has an eye washer switch 406. The safety shower can have a support base 408 (FIG. 8).

The testing apparatus and device can be configured according to predetermined testing standards, guidelines, regulations, laws, or other applicable technical or governmental requirements. In one example, the collection container is configured to be of a volume capacity in a range of from 5 to 20 gallons. In a further example, the collection container can have a volume capacity of about 6 gallons for testing a safety shower according to the aforementioned standard ANSI/ISEA Z358.1. In such testing, water discharged from the safety shower can be collected for about 10 second and the collected water can be measured to obtain a water discharge measurement data. The water discharge measurement data can be converted to the property data such as a flow rate of "gallons per minute" as specified by the aforementioned standard. The water discharge data, such as the flow rate data, can be compared to the standard to determine whether the safety shower is in compliance with the standard.

It would be advantageous to have an apparatus that is a shower testing device. It would be advantageous to have an apparatus that can test the flow of water from a multitude of fixtures including showers, safety showers, and fire sprinklers. Furthermore, it would also be advantageous to have an apparatus that is highly portable and adjustable to several different types and styles of showers, safety showers, and fire sprinklers. Still further, it would be advantageous to have an apparatus that has additional optional features such as a pH meter, thermometer, timing device, drainage pipe, or signage.

The invention provides a shower, safety shower, and fire sprinkler testing device, which provides a useful device for any environment, where it can be utilized to test shower effectiveness through daily, weekly and annual inspections.

In a further example, the invention is a shower/safety shower/fire sprinkler inspection tool. The tool provides a convenient and accurate way to measure flow rate, temperature, water spray pattern and other shower/sprinkler related specifications using one combined device. The device can be tailored to fit different industrial requirements for ANSI/ISEA Z358.1 or other standard compliance during regular or annual inspections, as described herein.

The apparatus has optional accessories that can be attached to the inspection device and funnels with different dimensions, shapes and buckets with different volumes and shapes designed to meet specific customer requirements. A pH meter, thermometer, timing device, drainage pipe, and signage are also all optional.

The apparatus has different sized funnels to measure spray diameter.

The apparatus fulfills the need for a device is able to measure all specifications defined by the regulatory requirements and compliance standards as set forth by ANSI/ISEA Z358.1.

It is still further an advantage of the invention to be height adjustable. The testing device is able to accommodate showers/sprinklers installed in different situations and to take water dispersal measurements at different height levels.

The testing apparatus can also be used to test and produce property data on solid, such as particle sizes, counts, or a combination thereof, as disclosed herein.

This invention is further directed to the use of any of the aforementioned testing apparatus, or any of the aforementioned liquid testing device.

What is claimed is:

1. A testing apparatus comprising:
   a base portion comprising a collection container;
   a height adjustable stem portion functionally coupled to the base portion, wherein the stem portion includes a height adjustment means allowing for the adjustment of the stem portion to accommodate varying heights for testing;
   a funnel portion functionally coupled to the stem portion; and
   a measurement device selected from a volume measurement device, a weight measurement device, a flow rate measurement device, a pH measurement device, a conductivity measurement device, a pressure measurement device, a thermal measurement device, a content measurement device, a viscosity measurement device, an optical measurement device, a digital control device functionally coupled to the measurement device, or a combination thereof;
   wherein the testing apparatus is configured to collect a specimen from a specimen discharger and produce property data of the specimen;
   wherein the stem portion is a tube or a pipe made from rigid metal, plastic, composite or glass that is configured to have an internal passage connecting the funnel portion and the collection container; and
   wherein the collection container, the stem portion and the funnel portion are functionally coupled so that the specimen is collected in the funnel portion, flows through the stem portion and enters the collection container.

2. The testing apparatus of claim 1, wherein the specimen is a solid, a gas, a superfluid, a liquid, or a combination thereof.

3. The testing apparatus of claim 1, wherein said property data comprise a flow rate of the specimen, volume of the specimen, weight of the specimen, particle size data of the specimen, or a combination thereof.

4. The testing apparatus of claim 1, wherein the specimen is a liquid and the specimen discharger is selected from a shower, a safety shower, a faucet, a sprayer, a lawn sprinkler, or a fire sprinkler.

5. The testing apparatus of claim 4, wherein said property data further comprise a flow rate of the specimen, temperature of the specimen, pH of the specimen, content data of the specimen, and a combination thereof.

6. The testing apparatus of claim 1, wherein the stem portion is rigid or flexible.

7. The testing apparatus of claim 1 further comprising a sealer coupled to the funnel portion and the specimen discharger.

8. A liquid testing device comprising:
   a base portion comprising a collection container;
   a height adjustable stem portion functionally coupled to the base portion, wherein the stem portion includes a height adjustment means allowing for the adjustment of the stem portion to accommodate varying heights for testing; and
   a funnel portion functionally coupled to the stem portion; and
   a measurement device selected from a volume measurement device, a weight measurement device, a flow rate measurement device, a pH measurement device, a conductivity measurement device, a pressure measurement device, a thermal measurement device, a content measurement device, a viscosity measurement device, an optical measurement device, or a combination thereof;
   wherein the liquid testing device is configured to collect a liquid from a liquid discharger and produce property data of the liquid;
   wherein the stem portion is a tube or a pipe made from rigid metal, plastic, composite or glass that is configured to have an internal passage connecting the funnel portion and the collection container; and
   wherein the collection container, the stem portion and the funnel portion are functionally coupled so that the liquid is collected in the funnel portion, flows through the stem portion and enters the collection container.

9. The liquid testing device of claim 8, wherein said property data comprise a liquid volume, liquid weight, a liquid flow rate, liquid temperature, a pattern of the liquid discharged from the liquid discharger, a flow of the liquid, temperature of the liquid, pH of the liquid, content data of the liquid, or a combination thereof.

10. The liquid testing device of claim 8, wherein the liquid discharger is selected from a shower, a safety shower, a faucet, a sprayer, a lawn sprinkler, or a fire sprinkler.

11. The liquid testing device of claim 8 further comprising a digital control device functionally coupled to the measurement device.

12. The liquid testing device of claim 8, wherein the stem portion is rigid or flexible.

13. The liquid testing device of claim 8 further comprising a sealer coupled to the funnel portion and the liquid discharger.

14. A testing process for producing property data of a liquid, the process comprising the steps of:

collecting a specimen of the liquid using a collection device affixed to a height adjustable stem device that is a tube or a pipe made from rigid metal, plastic, composite or glass that is configured to have an internal passage;

transporting the specimen from the collection device through said internal passage of the stem device to a collection container, and storing the specimen in the collection container;

measuring a measurement data of the specimen at the collection device, the stem device, the collection container, or a combination thereof;

producing the property data of the liquid based on the measurement data; and outputting the property data to a display device to display the property on the display device, to a non-transitory computer readable digital storage device, or a combination thereof.

15. The testing process of claim 14 further comprising the steps of detecting the specimen at the collection device to determine the specimen type and activate one or more measurement devices based on the specimen type.

16. The testing process of claim 14, wherein the property data comprise a liquid volume, a liquid weight, a liquid flow rate and liquid temperature.

17. The testing process of claim 16, wherein said property data further comprise a flow rate of the specimen, temperature of the specimen, pH of the specimen, content data of the specimen, and a combination thereof.

18. The testing process of claim 14 further comprising the step of selecting a collection time based on capacity of the collection container.

* * * * *